United States Patent
Yang et al.

(10) Patent No.: US 10,133,382 B2
(45) Date of Patent: Nov. 20, 2018

(54) STRUCTURE FOR INTEGRATED TOUCH SCREEN

(71) Applicant: Apple Inc., Cupertino, CA (US)

(72) Inventors: Byung Duk Yang, Cupertino, CA (US); Kyung Wook Kim, Cupertino, CA (US); Szu-Hsien Lee, San Jose, CA (US); Shih-Chang Chang, Cupertino, CA (US); John Z. Zhong, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/311,836

(22) PCT Filed: Oct. 2, 2014

(86) PCT No.: PCT/US2014/058773
§ 371 (c)(1),
(2) Date: Nov. 16, 2016

(87) PCT Pub. No.: WO2015/175013
PCT Pub. Date: Nov. 19, 2015

(65) Prior Publication Data
US 2017/0168619 A1    Jun. 15, 2017

Related U.S. Application Data

(60) Provisional application No. 61/994,661, filed on May 16, 2014.

(51) Int. Cl.
*G06F 3/041* (2006.01)
*G06F 3/044* (2006.01)
(Continued)

(52) U.S. Cl.
CPC .......... *G06F 3/0412* (2013.01); *G02F 1/1368* (2013.01); *G02F 1/13338* (2013.01);
(Continued)

(58) Field of Classification Search
None
See application file for complete search history.

(56) References Cited

U.S. PATENT DOCUMENTS 4,916,308 A    4/1990  Meadows
5,105,186 A    4/1992  May
(Continued)

FOREIGN PATENT DOCUMENTS

CN    1202254 A    12/1998
CN    1800923 A     7/2006
(Continued)

OTHER PUBLICATIONS

Chinese Search Report dated Mar. 23, 2011, for CN Application No. 2009201531939, with English Translation, 10 pages.
(Continued)

*Primary Examiner* — Kenneth B Lee, Jr.
(74) *Attorney, Agent, or Firm* — Morrison & Foerster LLP (57) ABSTRACT

A touch screen is disclosed. The touch screen can comprise a substrate having a first surface upon which a touch or proximity event is to be detected, and a second surface that opposes the first surface, and a touch sensor electrode and a first display pixel including a first display pixel TFT formed on the second surface of the substrate. The first touch sensor electrode can be disposed between the second surface of the substrate and the first display pixel TFT, and the first touch sensor electrode can be configured to detect the touch or proximity event. In some examples, the substrate can comprise a TFT glass substrate. In some examples, the touch screen can comprise a first touch sensor routing electrically coupled to the first touch sensor electrode, wherein the first touch sensor routing is disposed between the second surface of the substrate and the first display pixel TFT.

25 Claims, 6 Drawing Sheets

(51) Int. Cl.
*G02F 1/1333* (2006.01)
*G02F 1/1368* (2006.01)
*G02F 1/1343* (2006.01)
*G02F 1/1362* (2006.01)

(52) U.S. Cl.
CPC ........ *G02F 1/134309* (2013.01); *G06F 3/044* (2013.01); *G02F 2001/133302* (2013.01); *G02F 2001/136222* (2013.01); *G02F 2201/121* (2013.01); *G02F 2201/123* (2013.01); *G06F 2203/04103* (2013.01); *G06F 2203/04108* (2013.01)

(56) References Cited

U.S. PATENT DOCUMENTS

| | | |
|---|---|---|
| 5,483,261 A | 1/1996 | Yasutake |
| 5,488,204 A | 1/1996 | Mead et al. |
| 5,589,856 A | 12/1996 | Stein et al. |
| 5,606,346 A | 2/1997 | Kai et al. |
| 5,825,352 A | 10/1998 | Bisset et al. |
| 5,835,079 A | 11/1998 | Shieh |
| 5,838,308 A | 11/1998 | Knapp et al. |
| 5,841,427 A | 11/1998 | Teterwak |
| 5,847,690 A | 12/1998 | Boie et al. |
| 5,880,411 A | 3/1999 | Gillespie et al. |
| 5,889,236 A | 3/1999 | Gillespie et al. |
| 5,914,465 A | 6/1999 | Allen et al. |
| 6,025,647 A | 2/2000 | Shenoy et al. |
| 6,057,903 A | 5/2000 | Colgan et al. |
| 6,177,918 B1 | 1/2001 | Colgan et al. |
| 6,188,391 B1 | 2/2001 | Seely et al. |
| 6,204,897 B1 | 3/2001 | Colgan et al. |
| 6,310,610 B1 | 10/2001 | Beaton et al. |
| 6,323,846 B1 | 11/2001 | Westerman et al. |
| 6,380,931 B1 | 4/2002 | Gillespie et al. |
| 6,483,498 B1 | 11/2002 | Colgan et al. |
| 6,501,529 B1 | 12/2002 | Kurihara et al. |
| 6,586,101 B2 | 7/2003 | Chu |
| 6,587,358 B1 | 7/2003 | Yasumura |
| 6,680,448 B2 | 1/2004 | Kawashima et al. |
| 6,690,387 B2 | 2/2004 | Zimmerman et al. |
| 6,778,163 B2 | 8/2004 | Ozawa |
| 6,847,354 B2 | 1/2005 | Vranish |
| 6,914,640 B2 | 7/2005 | Yu |
| 7,015,894 B2 | 3/2006 | Morohoshi |
| 7,042,444 B2 | 5/2006 | Cok |
| 7,133,032 B2 | 11/2006 | Cok |
| 7,184,064 B2 | 2/2007 | Zimmerman et al. |
| 7,202,856 B2 | 4/2007 | Cok |
| 7,230,608 B2 | 6/2007 | Cok |
| 7,280,167 B2 | 10/2007 | Choi et al. |
| 7,379,054 B2 | 5/2008 | Lee |
| 7,482,187 B2 | 1/2009 | Shibusawa |
| 7,605,864 B2 | 10/2009 | Takahashi et al. |
| 7,663,607 B2 | 2/2010 | Hotelling et al. |
| 7,701,539 B2 | 4/2010 | Shih et al. |
| 7,705,834 B2 | 4/2010 | Swedin |
| 7,859,521 B2 | 12/2010 | Hotelling et al. |
| 7,880,703 B2 | 2/2011 | Park et al. |
| 7,898,122 B2 | 3/2011 | Andrieux et al. |
| 7,995,041 B2 | 8/2011 | Hotelling et al. |
| 8,217,913 B2 | 7/2012 | Hotelling et al. |
| 8,264,428 B2 | 9/2012 | Nam |
| 8,355,887 B1 | 1/2013 | Harding et al. |
| 8,363,027 B2 | 1/2013 | Hotelling et al. |
| 8,479,122 B2 | 7/2013 | Hotelling et al. |
| 8,502,799 B2 | 8/2013 | Hotelling et al. |
| 8,508,495 B2 | 8/2013 | Hotelling et al. |
| 8,576,161 B2 | 11/2013 | Chang et al. |
| 8,654,083 B2 | 2/2014 | Hotelling et al. |
| 8,665,237 B2 | 3/2014 | Koshiyama et al. |
| 8,743,087 B2 | 6/2014 | Hotelling et al. |
| 8,766,950 B1 | 7/2014 | Morein et al. |
| 8,773,351 B2 | 7/2014 | Rekimoto |
| 8,773,397 B2 | 7/2014 | Hotelling et al. |
| 8,890,850 B2 | 11/2014 | Chung et al. |
| 8,917,256 B2 | 12/2014 | Roziere |
| 9,000,782 B2 | 4/2015 | Roziere |
| 9,075,490 B2 | 7/2015 | Hotelling et al. |
| 9,117,679 B2 | 8/2015 | Ma |
| 9,134,560 B2 | 9/2015 | Hotelling et al. |
| 9,151,791 B2 | 10/2015 | Roziere |
| 9,250,757 B2 | 2/2016 | Roziere |
| 9,336,723 B2 | 5/2016 | Gupta et al. |
| 9,354,761 B2 | 5/2016 | Hotelling et al. |
| 9,423,897 B2 * | 8/2016 | Bae .................. G06F 3/041 |
| 9,442,330 B2 | 9/2016 | Huo |
| 9,535,547 B2 | 1/2017 | Roziere |
| 9,640,991 B2 | 5/2017 | Blondin et al. |
| 9,760,200 B2 | 9/2017 | Hotelling et al. |
| 2001/0040665 A1 | 11/2001 | Ahn |
| 2002/0015024 A1 | 2/2002 | Westerman et al. |
| 2002/0084992 A1 | 7/2002 | Agnew |
| 2003/0075427 A1 | 4/2003 | Caldwell |
| 2003/0234769 A1 | 12/2003 | Cross et al. |
| 2004/0141096 A1 | 7/2004 | Mai |
| 2004/0189587 A1 | 9/2004 | Jung et al. |
| 2004/0239650 A1 | 12/2004 | Mackey |
| 2004/0243747 A1 | 12/2004 | Rekimoto |
| 2005/0052582 A1 | 3/2005 | Mai |
| 2005/0179668 A1 | 8/2005 | Edwards |
| 2005/0219228 A1 | 10/2005 | Alameh et al. |
| 2005/0231487 A1 | 10/2005 | Ming |
| 2005/0243023 A1 | 11/2005 | Reddy et al. |
| 2006/0007165 A1 | 1/2006 | Yang et al. |
| 2006/0109222 A1 | 5/2006 | Lee et al. |
| 2006/0145365 A1 | 7/2006 | Halls et al. |
| 2006/0146033 A1 | 7/2006 | Chen et al. |
| 2006/0146034 A1 | 7/2006 | Chen et al. |
| 2006/0161871 A1 | 7/2006 | Hotelling et al. |
| 2006/0197753 A1 | 9/2006 | Hotelling |
| 2006/0220033 A1 | 10/2006 | Yamasaki |
| 2006/0244736 A1 | 11/2006 | Tseng |
| 2006/0262100 A1 | 11/2006 | Van Berkel |
| 2006/0284639 A1 | 12/2006 | Reynolds |
| 2007/0018969 A1 | 1/2007 | Chen et al. |
| 2007/0040814 A1 | 2/2007 | Lee et al. |
| 2007/0075977 A1 | 4/2007 | Chen et al. |
| 2007/0165009 A1 | 7/2007 | Sakurai et al. |
| 2007/0176905 A1 | 8/2007 | Shih et al. |
| 2007/0216657 A1 | 9/2007 | Konicek |
| 2007/0222762 A1 | 9/2007 | Van Delden et al. |
| 2007/0240914 A1 | 10/2007 | Lai et al. |
| 2007/0252801 A1 | 11/2007 | Park et al. |
| 2007/0262967 A1 | 11/2007 | Rho |
| 2007/0279395 A1 | 12/2007 | Philipp et al. |
| 2008/0012835 A1 | 1/2008 | Rimon et al. |
| 2008/0018581 A1 | 1/2008 | Park et al. |
| 2008/0042985 A1 | 2/2008 | Katsuhito et al. |
| 2008/0048994 A1 | 2/2008 | Lee et al. |
| 2008/0055221 A1 | 3/2008 | Yabuta et al. |
| 2008/0055268 A1 | 3/2008 | Yoo et al. |
| 2008/0062139 A1 | 3/2008 | Hotelling et al. |
| 2008/0062140 A1 | 3/2008 | Hotelling et al. |
| 2008/0062147 A1 | 3/2008 | Hotelling et al. |
| 2008/0062148 A1 | 3/2008 | Hotelling et al. |
| 2008/0067528 A1 | 3/2008 | Choi et al. |
| 2008/0074401 A1 | 3/2008 | Chung et al. |
| 2008/0100572 A1 | 5/2008 | Boillot |
| 2008/0122800 A1 | 5/2008 | Meng |
| 2008/0129898 A1 | 6/2008 | Moon |
| 2008/0136980 A1 | 6/2008 | Rho et al. |
| 2008/0150901 A1 | 6/2008 | Lowles et al. |
| 2008/0158118 A1 | 7/2008 | Ono et al. |
| 2008/0174321 A1 | 7/2008 | Kang et al. |
| 2008/0180365 A1 | 7/2008 | Ozaki |
| 2008/0186288 A1 | 8/2008 | Chang |
| 2008/0195180 A1 | 8/2008 | Stevenson et al. |
| 2008/0218488 A1 | 9/2008 | Yang et al. |
| 2008/0246496 A1 | 10/2008 | Hristov et al. |
| 2008/0273000 A1 | 11/2008 | Park et al. |
| 2008/0278178 A1 | 11/2008 | Philipp |
| 2008/0278458 A1 | 11/2008 | Masuzawa et al. |

(56) References Cited

U.S. PATENT DOCUMENTS

| | | |
|---|---|---|
| 2008/0309627 A1 | 12/2008 | Hotelling et al. |
| 2008/0309631 A1 | 12/2008 | Westerman |
| 2009/0002331 A1 | 1/2009 | Kamiya et al. |
| 2009/0009486 A1 | 1/2009 | Sato et al. |
| 2009/0091546 A1 | 4/2009 | Joo et al. |
| 2009/0096760 A1 | 4/2009 | Ma et al. |
| 2009/0141046 A1 | 6/2009 | Rathnam et al. |
| 2009/0179868 A1 | 7/2009 | Ayres et al. |
| 2009/0194344 A1 | 8/2009 | Harley et al. |
| 2009/0212642 A1 | 8/2009 | Krah |
| 2009/0237369 A1 | 9/2009 | Hur et al. |
| 2009/0309851 A1 | 12/2009 | Bernstein |
| 2009/0322730 A1 | 12/2009 | Yamamoto et al. |
| 2010/0001973 A1 | 1/2010 | Hotelling et al. |
| 2010/0004029 A1 | 1/2010 | Kim |
| 2010/0007616 A1 | 1/2010 | Jang |
| 2010/0013745 A1 | 1/2010 | Kim et al. |
| 2010/0019779 A1 | 1/2010 | Kato et al. |
| 2010/0031174 A1 | 2/2010 | Kim |
| 2010/0045632 A1 | 2/2010 | Yilmaz et al. |
| 2010/0090964 A1 | 4/2010 | Soo et al. |
| 2010/0097346 A1 | 4/2010 | Sleeman |
| 2010/0123667 A1 | 5/2010 | Kim et al. |
| 2010/0139991 A1 | 6/2010 | Philipp et al. |
| 2010/0149127 A1 | 6/2010 | Fisher et al. |
| 2010/0182018 A1 | 7/2010 | Hazelden |
| 2010/0194697 A1 | 8/2010 | Hotelling et al. |
| 2010/0194699 A1 | 8/2010 | Hotelling et al. |
| 2010/0194707 A1 | 8/2010 | Chang |
| 2010/0201635 A1 | 8/2010 | Klinghult et al. |
| 2010/0265187 A1 | 10/2010 | Chang et al. |
| 2010/0265188 A1 | 10/2010 | Chang et al. |
| 2010/0321305 A1 | 12/2010 | Chang et al. |
| 2010/0328262 A1 | 12/2010 | Huang et al. |
| 2011/0001491 A1 | 1/2011 | Huang et al. |
| 2011/0006999 A1 | 1/2011 | Chang et al. |
| 2011/0007021 A1 | 1/2011 | Bernstein et al. |
| 2011/0007030 A1 | 1/2011 | Mo et al. |
| 2011/0025635 A1 | 2/2011 | Lee |
| 2011/0061949 A1 | 3/2011 | Krah et al. |
| 2011/0080391 A1 | 4/2011 | Brown et al. |
| 2011/0228187 A1 | 9/2011 | Wu et al. |
| 2011/0242027 A1 | 10/2011 | Chang |
| 2012/0026132 A1 | 2/2012 | Hotelling et al. |
| 2012/0182251 A1 | 7/2012 | Krah |
| 2012/0187965 A1 | 7/2012 | Roziere |
| 2012/0242597 A1 | 9/2012 | Hwang et al. |
| 2012/0274603 A1* | 11/2012 | Kim ............... G06F 3/0412 345/174 |
| 2013/0076647 A1 | 3/2013 | Yousefpor et al. |
| 2013/0141343 A1* | 6/2013 | Yu ............... G06F 3/0412 345/173 |
| 2013/0170116 A1 | 7/2013 | In et al. |
| 2013/0181943 A1* | 7/2013 | Bulea ............... G06F 3/044 345/174 |
| 2013/0293499 A1 | 11/2013 | Chang et al. |
| 2013/0328800 A1 | 12/2013 | Pu et al. |
| 2014/0070823 A1 | 3/2014 | Roziere |
| 2014/0078096 A1 | 3/2014 | Tan et al. |
| 2014/0132534 A1 | 5/2014 | Kim |
| 2014/0132560 A1 | 5/2014 | Huang et al. |
| 2014/0267165 A1 | 9/2014 | Roziere |
| 2015/0194470 A1 | 7/2015 | Hwang |
| 2015/0363032 A1 | 12/2015 | Hotelling et al. |
| 2016/0034102 A1 | 2/2016 | Roziere et al. |
| 2016/0170533 A1 | 6/2016 | Roziere |
| 2016/0253034 A1 | 9/2016 | Gupta et al. |
| 2017/0090644 A1 | 3/2017 | Yao |
| 2017/0108968 A1 | 4/2017 | Roziere |
| 2017/0220156 A1 | 8/2017 | Blondin |
| 2017/0315646 A1 | 11/2017 | Roziere |

FOREIGN PATENT DOCUMENTS

| | | |
|---|---|---|
| CN | 1875312 A | 12/2006 |
| CN | 1942853 A | 4/2007 |
| CN | 1959481 A | 5/2007 |
| CN | 10-1140366 A | 3/2008 |
| CN | 10-1140368 A | 3/2008 |
| CN | 10-1354625 A | 1/2009 |
| CN | 2012-18943 Y | 4/2009 |
| CN | 102 760 405 A | 10/2012 |
| CN | 10-2881839 A | 1/2013 |
| DE | 11-2012 004912 T5 | 8/2014 |
| EP | 1 192 585 B1 | 4/2002 |
| EP | 1 422 601 A2 | 5/2004 |
| EP | 1 455 264 A1 | 9/2004 |
| EP | 2 144 146 A1 | 1/2010 |
| EP | 2 148 264 A2 | 1/2010 |
| EP | 2 224 277 A1 | 9/2010 |
| FR | 2 756 048 A1 | 5/1998 |
| FR | 2 896 595 A1 | 7/2007 |
| FR | 3 004 551 A1 | 10/2014 |
| JP | 03-081735 A | 4/1991 |
| JP | 7-110742 A | 4/1995 |
| JP | 2000-163031 A | 6/2000 |
| JP | 2002-342033 A | 11/2002 |
| JP | 2004-526265 A | 8/2004 |
| JP | 2005-523496 A | 8/2005 |
| JP | 2006-064769 A | 3/2006 |
| JP | 2006-251927 A | 9/2006 |
| JP | 2006-344163 A | 12/2006 |
| JP | 2007-334347 A | 12/2007 |
| JP | 2008-070983 A | 3/2008 |
| JP | 2008-117371 A | 5/2008 |
| JP | 2008-281616 A | 11/2008 |
| JP | 2009-086240 A | 4/2009 |
| JP | 2009-157373 A | 7/2009 |
| JP | 2011-141464 A | 7/2011 |
| KR | 10-2006-0073590 | 6/2006 |
| KR | 10-2007-0082757 | 8/2007 |
| KR | 10-2007-0102414 | 10/2007 |
| KR | 10-2008-0041278 | 5/2008 |
| KR | 10-2008-0047332 A | 5/2008 |
| KR | 10-2008-0060127 A | 7/2008 |
| KR | 10-2010-0054899 A | 5/2010 |
| TW | 2004-11266 | 7/2004 |
| TW | I234676 B | 6/2005 |
| TW | 2008-26032 | 6/2008 |
| TW | I303050 B | 11/2008 |
| TW | 2008-46990 | 12/2008 |
| TW | 201126236 A1 | 8/2011 |
| WO | WO-95/27334 A1 | 10/1995 |
| WO | WO-2005/015373 A2 | 2/2005 |
| WO | WO-2005/015373 A3 | 2/2005 |
| WO | WO-2005/101178 A2 | 10/2005 |
| WO | WO-2005/101178 A3 | 10/2005 |
| WO | WO-2005/114369 A2 | 12/2005 |
| WO | WO-2005/114369 A3 | 12/2005 |
| WO | WO-2006/126703 A2 | 11/2006 |
| WO | WO-2007/003108 A1 | 1/2007 |
| WO | WO-2007/146779 A2 | 12/2007 |
| WO | WO-2007/146779 A3 | 12/2007 |
| WO | WO-2007/146780 A2 | 12/2007 |
| WO | WO-2007/146783 A2 | 12/2007 |
| WO | WO-2007/146783 A3 | 12/2007 |
| WO | WO-2008/000964 A1 | 1/2008 |
| WO | WO-2008/030780 A1 | 3/2008 |
| WO | WO-2010/002929 A2 | 1/2010 |
| WO | WO-2010/088666 A1 | 8/2010 |
| WO | WO-2010/088670 A1 | 8/2010 |
| WO | WO-2011/015795 | 2/2011 |
| WO | WO-2013/093327 | 6/2013 |
| WO | WO-2014/126661 | 8/2014 |
| WO | WO-2015/088629 A1 | 6/2015 |

(56) References Cited

FOREIGN PATENT DOCUMENTS

WO  WO-2015/175013 A1  11/2015
WO  WO-2016/066282 A1  5/2016

OTHER PUBLICATIONS

Chinese Search Report completed Dec. 16, 2011, for CN Application No. ZL2010201083672, filed Feb. 2, 2010, with English Translation, 15 pages.
Chinese Search Report completed Mar. 27, 2012, for CN Application No. ZL2010201083672, filed Feb. 2, 2010, with English Translation, 16 pages.
Chinese Search Report dated Nov. 4, 2015, for CN Application No. 201310128546.0, with English Translation, four pages.
Chinese Search Report dated, Mar. 30, 2016, for CN Application No. 201410145483.4, filed Jul. 3, 2009, with English Translation, four pages.
European Search Report dated Jul. 6, 2010, for EP Application No. 10151966.8, seven pages.
European Search Report dated Dec. 9, 2010, for EP Application No. 09164196.9, filed Jun. 30, 2009, six pages.
European Search Report dated Oct. 4, 2011, for EP Application No. 09164196.9, filed Jun. 30, 2009, 11 pages.
Final Office Action dated May 15, 2012, for U.S. Appl. No. 12/240,964, filed Sep. 29, 2008, 39 pages.
Final Office Action dated Nov. 13, 2014, for U.S. Appl. No. 14/275,527, filed May 12, 2014, ten pages.
International Search Report dated Mar. 17, 2010, for PCT Application No. PCT/US10/22883, filed Feb. 2, 2010, one page.
International Search Report dated Jun. 25, 2010, for PCT Application No. PCT/US10/22888, filed Feb. 2, 2010, two pages.
International Search Report dated Mar. 15, 2011, for PCT Application No. PCT/US2009/049313, filed Jun. 30, 2009, seven pages.
International Search Report dated Jun. 17, 2014 for PCT Application No. PCT/US2014/010901, five pages.
International Search Report dated Dec. 31, 2014, for PCT Application No. PCT/US14/58367, filed Sep. 30, 2014, two pages.
Kanda, E. et al. (2008). "55.2: Integrated Active Matrix Capacitive Sensors for Touch Panel LTPS-TFT LCDs," *SID 08 Digest*, pp. 834-837.
Non-Final Office Action dated Sep. 15, 2011, for U.S. Appl. No. 12/545,649, filed Aug. 21, 2009, 1449 nine pages.
Non-Final Office Action dated Nov. 9, 2011, for U.S. Appl. No. 12/240,964, filed Sep. 29, 2008, 27 pages.
Non-Final Office Action dated Jul. 9, 2014, for U.S. Appl. No. 14/275,527, filed May 12, 2014, eight pages.
Non-Final Office Action dated Dec. 12, 2014, for U.S. Appl. No. 13/943,669, filed Jul. 16, 2013, twelve pages.
Non-Final Office Action dated Feb. 3, 2015, for U.S. Appl. No. 14/275,527, filed May 12, 2014, 8 pages.
Non-Final Office Action dated Jul. 31, 2015 for U.S. Appl. No. 13/766,376, filed Feb. 13, 2013, 28 pages.
Notice of Allowance dated Jun. 10, 2010, for U.S. Appl. No. 12/756,834, filed Apr. 8, 2010, six pages.
Notice of Allowance dated Jul. 7, 2010, for U.S. Appl. No. 12/558,488, filed Sep. 11, 2009, six pages.
Notice of Allowance dated Mar. 12, 2012, for U.S. Appl. No. 12/545,649, filed Aug. 21, 2009, seven pages.
Notice of Allowance dated Nov. 6, 2012, for U.S. Appl. No. 13/527,470, filed Jun. 19, 2012, 11 pages.
Notice of Allowance dated Apr. 17, 2013, for U.S. Appl. No. 12/240,964, filed Sep. 29, 2008, 13 pages.
Notice of Allowance dated Apr. 17, 2013 for U.S. Appl. No. 13/717,593, filed Dec. 17, 2012, 9 pages.
Notice of Allowance dated Nov. 13, 2013, for U.S. Appl. No. 13/936,980, filed Jul. 8, 2013, 20 pages.
Notice of Allowance dated Apr. 1, 2014, for U.S. Appl. No. 14/155,063, filed Jan. 14, 2014, 12 pages.
Notice of Allowance dated May 7, 2015, for U.S. Appl. No. 13/943,669, filed Jul. 16, 2013, five pages.
Notice of Allowance dated May 12, 2015, for U.S. Appl. No. 14/275,527, filed May 12, 2014, seven pages.
Notice of Allowance dated Jan. 11, 2016 for U.S. Appl. No. 13/766,376, filed Feb. 13, 2013, ten pages.
Notice of Allowance dated Jan. 22, 2016, for U.S. Appl. No. 14/738,648, filed Jun. 12, 2015, nine pages.
Notice of Allowance dated May 2, 2017, for U.S. Appl. No. 14/835,515, filed Aug. 25, 2015, twelve pages.
Supplemental Notice of Allowability dated May 19, 2011, for U.S. Appl. No. 12/558,488, filed Sep. 11, 2009, 10 pages (includes Notice of Allowance dated May 6, 2011.).
Supplemental Notice of Allowance dated Jan. 30, 2014, for U.S. Appl. No. 13/936,980, filed Jul. 8, 2013, 2 pages.
TW Search Report/Office Action dated Jan. 29, 2014, for TW Patent Application No. 099103062, with English Translation, two pages.
TW Search Report/Office Action dated Dec. 1, 2015, for TW Patent Application No. 103124315, with English Translation, three pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Notice of Allowance dated Mar. 14, 2018, for U.S. Appl. No. 15/148,798, filed May 6, 2016, ten pages.
European Search Report dated Oct. 6, 2017, for EP Application No. 14868756.9, eleven pages.
Non-Final Office Action dated Oct. 30, 2017, for U.S. Appl. No. 15/148,798, filed May 6, 2016, eleven pages.
Non-Final Office Action dated Nov. 24, 2017, for U.S. Appl. No. 15/039,400, filed May 25, 2016, sixteen pages.

* cited by examiner

STRUCTURE FOR INTEGRATED TOUCH SCREEN

CROSS-REFERENCE TO RELATED APPLICATIONS

This application is a National Phase application under 35 U.S.C. § 371 of International Application No. PCT/US2014/058773, filed Oct. 2, 2014, which claims the priority benefit of U.S. Application No. 61/994,661, filed May 16, 2014, the contents of which are hereby incorporated by reference in their entireties for all intended purposes.

FIELD OF THE DISCLOSURE

This relates generally to touch sensor panels that are integrated with displays.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Some capacitive touch sensor panels can be formed by a matrix of substantially transparent conductive plates made of materials such as Indium Tin Oxide (ITO). It is due in part to their substantial transparency that capacitive touch sensor panels can be overlaid on a display to form a touch screen, as described above. Some touch screens can be formed by at least partially integrating touch sensing circuitry into a display pixel stackup (i.e., the stacked material layers forming the display pixels).

SUMMARY OF THE DISCLOSURE

Some capacitive touch sensor panels can be formed by a matrix of substantially transparent conductive plates made of materials such as Indium Tin Oxide (ITO), and some touch screens can be formed by at least partially integrating touch sensing circuitry into a display pixel stackup (i.e., the stacked material layers forming the display pixels). The examples of the disclosure provide various techniques for integrating touch sensing circuitry into a display pixel stackup using independent touch sensing and display structures to reduce the overall thickness of the display pixel stackup.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Some capacitive touch sensor panels can be formed by a matrix of substantially transparent conductive plates made of materials such as Indium Tin Oxide (ITO), and some touch screens can be formed by at least partially integrating touch sensing circuitry into a display pixel stackup (i.e., the stacked material layers forming the display pixels). The examples of the disclosure provide various techniques for integrating touch sensing circuitry into a display pixel stackup using independent touch sensing and display structures to reduce the overall thickness of the display pixel stackup.

Figure 1A:
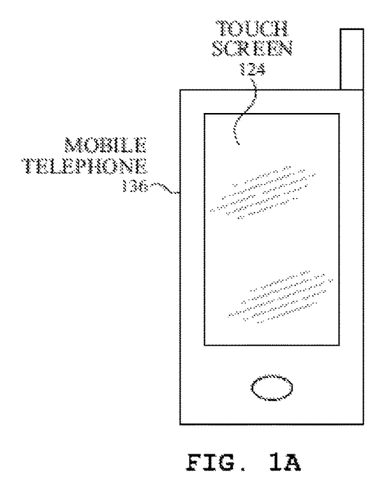
FIGS. 1A-1C illustrate an example mobile telephone, an example media player, and an example portable computing device that each include an exemplary touch screen according to examples of the disclosure.
Figure 1B:
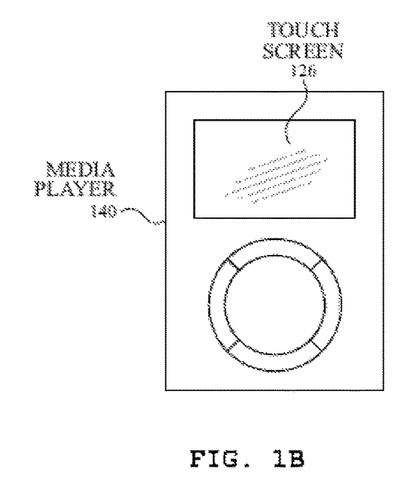
Figure 1C:
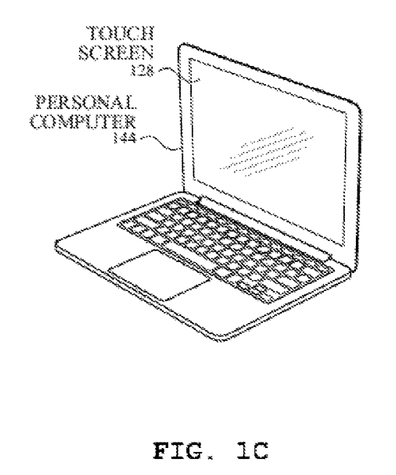

FIGS. 1A-1C show example systems in which a touch screen according to examples of the disclosure may be implemented. FIG. 1A illustrates an example mobile telephone 136 that includes a touch screen 124. FIG. 1B illustrates an example digital media player 140 that includes a touch screen 126. FIG. 1C illustrates an example portable computing device 144 that includes a touch screen 128. It is understood that the above touch screens can be implemented in other devices as well, including in wearable devices.

In some examples, touch screens 124, 126 and 128 can be based on self-capacitance. A self-capacitance based touch system can include a matrix of small, individual plates of conductive material that can be referred to as touch pixel electrodes (as described below with reference to touch screen 220 in FIG. 2). For example, a touch screen can include a plurality of individual touch pixel electrodes, each touch pixel electrode identifying or representing a unique location on the touch screen at which touch or proximity (i.e., a touch or proximity event) is to be sensed, and each touch pixel electrode being electrically isolated from the other touch pixel electrodes in the touch panel/screen. Such a touch screen can be referred to as a pixelated self-capacitance touch screen. During operation, a touch pixel electrode can be stimulated with an AC waveform, and the self-capacitance to ground of the touch pixel electrode can be measured. As an object approaches the touch pixel electrode, the self-capacitance to ground of the touch pixel electrode can change. This change in the self-capacitance of the touch pixel electrode can be detected and measured by the touch sensing system to determine the positions of multiple objects when they touch, or come in proximity to, the touch screen. In some examples, the electrodes of a self-capacitance based touch system can be formed from rows and columns of conductive material, and changes in the self-capacitance to ground of the rows and columns can be detected, similar to above.

Figure 1D:
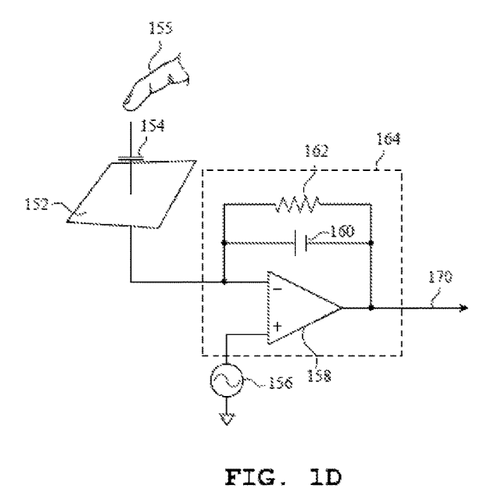
FIG. 1D illustrates an exemplary touch sensor circuit corresponding to a self-capacitance touch pixel electrode and sensing circuit according to examples of the disclosure.

FIG. 1D illustrates an exemplary touch sensor circuit corresponding to a self-capacitance touch pixel electrode 152 and sensing circuit 164 according to examples of the disclosure. Touch pixel electrode 152 can correspond to touch pixel electrode 222 in FIG. 2, below. Touch pixel electrode 152 can have an inherent self-capacitance to ground associated with it, and also an additional self-capacitance to ground that is formed when an object, such as finger 155, is in proximity to or touching the electrode. The total self-capacitance to ground of touch pixel electrode 152 can be illustrated as capacitance 154. Touch pixel electrode 152 can be coupled to sensing circuit 164. Sensing circuit 164 can include an operational amplifier 158, feedback resistor 162, feedback capacitor 160 and an input voltage source 156, although other configurations can be employed. For example, feedback resistor 162 can be replaced by a switched capacitor resistor in order to minimize any parasitic capacitance effect caused by a variable feedback resistor. Touch pixel electrode 152 can be coupled to the inverting input of operational amplifier 158. An AC voltage source 156 (Vac) can be coupled to the non-inverting input of operational amplifier 158. The touch sensor circuit can be configured to sense changes in the total self-capacitance 154 of the touch pixel electrode 152 induced by a finger or object either touching or in proximity to the touch sensor panel. Output 170 can be used by a processor to determine the presence of a proximity or touch event, or the output can be inputted into a discrete logic network to determine the presence of a touch or proximity event.

In some examples, touch screens 124, 126 and 128 can be based on mutual capacitance. A mutual capacitance based touch system can include, for example, drive regions and sense regions, such as drive lines and sense lines. For example, drive lines can be formed in rows while sense lines can be formed in columns (e.g., orthogonal). Mutual capacitance touch pixels can be formed at the intersections of the rows and columns. During operation, the rows can be stimulated with an AC waveform and a mutual capacitance can be formed between the row and the column of the mutual capacitance touch pixel. As an object approaches the mutual capacitance touch pixel, some of the charge being coupled between the row and column of the mutual capacitance touch pixel can instead be coupled onto the object. This reduction in charge coupling across the mutual capacitance touch pixel can result in a net decrease in the mutual capacitance between the row and the column and a reduction in the AC waveform being coupled across the mutual capacitance touch pixel. This reduction in the charge-coupled AC waveform can be detected and measured by the touch sensing system to determine the positions of multiple objects when they touch the touch screen. In some examples, a touch screen can be multi-touch, single touch, projection scan, full-imaging multi-touch, capacitive touch, etc.

Figure 2:
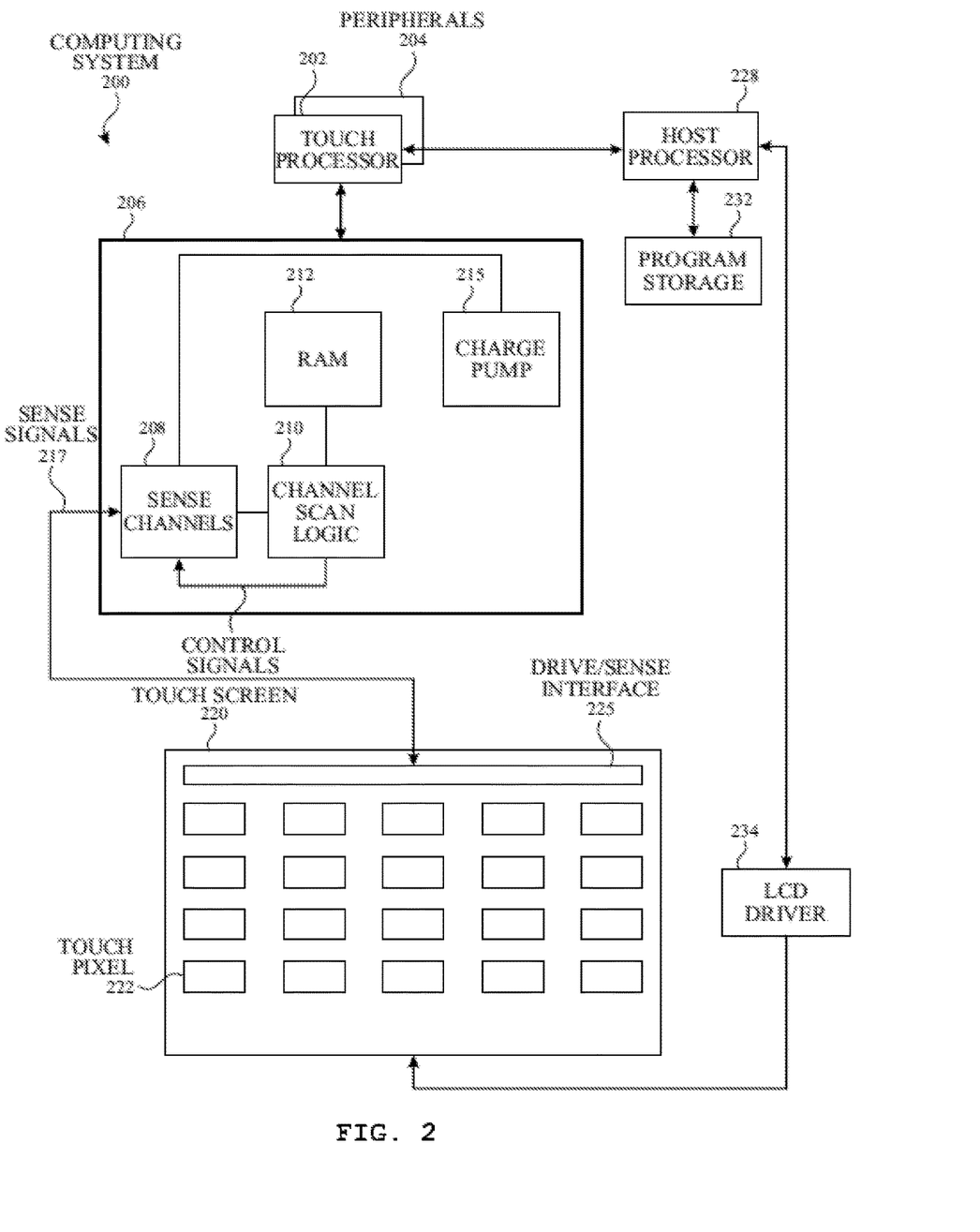
FIG. 2 is a block diagram of an example computing system that illustrates one implementation of an example touch screen according to examples of the disclosure.

FIG. 2 is a block diagram of an example computing system 200 that illustrates one implementation of an example touch screen 220 according to examples of the disclosure. Computing system 200 can be included in, for example, mobile telephone 136, digital media player 140, portable computing device 144, or any mobile or non-mobile computing device that includes a touch screen, including a wearable device. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208 and channel scan logic 210. Channel scan logic 210 can access RAM 212, autonomously read data from sense channels 208 and provide control for the sense channels. In addition, channel scan logic 210 can control sense channels 208 to generate stimulation signals at various frequencies and phases that can be selectively applied to the touch pixel electrodes of touch screen 220, as described in more detail below. In some examples, touch controller 206, touch processor 202 and peripherals 204 can be integrated into a single application specific integrated circuit (ASIC), and in some examples can be integrated with touch screen 220 itself.

Touch screen 220 can be a self-capacitance touch screen, and can include touch sensing circuitry that can include a capacitive sensing medium having a plurality of electrically isolated touch pixel electrodes 222 (e.g., a pixelated self-capacitance touch screen). It is understood that while touch screen 220 is described here as including touch pixel electrodes 222, the touch screen can additionally or alternatively include rows and columns of conductive material; the operation of such a touch screen would be similar to that described here. Additionally, it is understood that in some examples, touch screen 220 can be a mutual capacitance touch screen, as described above, though the description that follows will assume that the touch screen is a self-capacitance touch screen having a plurality of touch pixel electrodes. Touch pixel electrodes 222 can be coupled to sense channels 208 in touch controller 206, can be driven by stimulation signals from the sense channels through drive/sense interface 225, and can be sensed by the sense channels through the drive/sense interface as well, as described above. Labeling the conductive plates used to detect touch (i.e., touch pixel electrodes 222) as "touch pixel" electrodes can be particularly useful when touch screen 220 is viewed as capturing an "image" of touch. In other words, after touch controller 206 has determined an amount of touch detected at each touch pixel electrode 222 in touch screen 220, the pattern of touch pixel electrodes in the touch screen at which a touch occurred can be thought of as an "image" of touch (e.g., a pattern of fingers touching the touch screen).

Computing system 200 can also include a host processor 228 for receiving outputs from touch processor 202 and performing actions based on the outputs. For example, host processor 228 can be connected to program storage 232 and a display controller, such as an LCD driver 234. The LCD driver 234 can provide voltages on select (gate) lines to each pixel transistor and can provide data signals along data lines to these same transistors to control the pixel display image as described in more detail below. Host processor 228 can use LCD driver 234 to generate an image on touch screen 220, such as an image of a user interface (UI), and can use touch processor 202 and touch controller 206 to detect a touch on or near touch screen 220. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described above, including the configuration of switches, can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

In some examples, a touch screen can be formed by overlaying a touch sensor panel (e.g., a self-capacitance touch sensor panel and/or a mutual capacitance touch sensor panel having electrode configurations as described above) on a display to form the touch screen. However, in some examples, it may be desirable to integrate the structure of the touch sensor panel with the structure of the display to, for example, make the combined touch screen structure thinner than it might have otherwise been if the touch sensor panel had been overlaid on the display. The examples of the disclosure provide one or more ways of accomplishing such integration.

Figure 3:
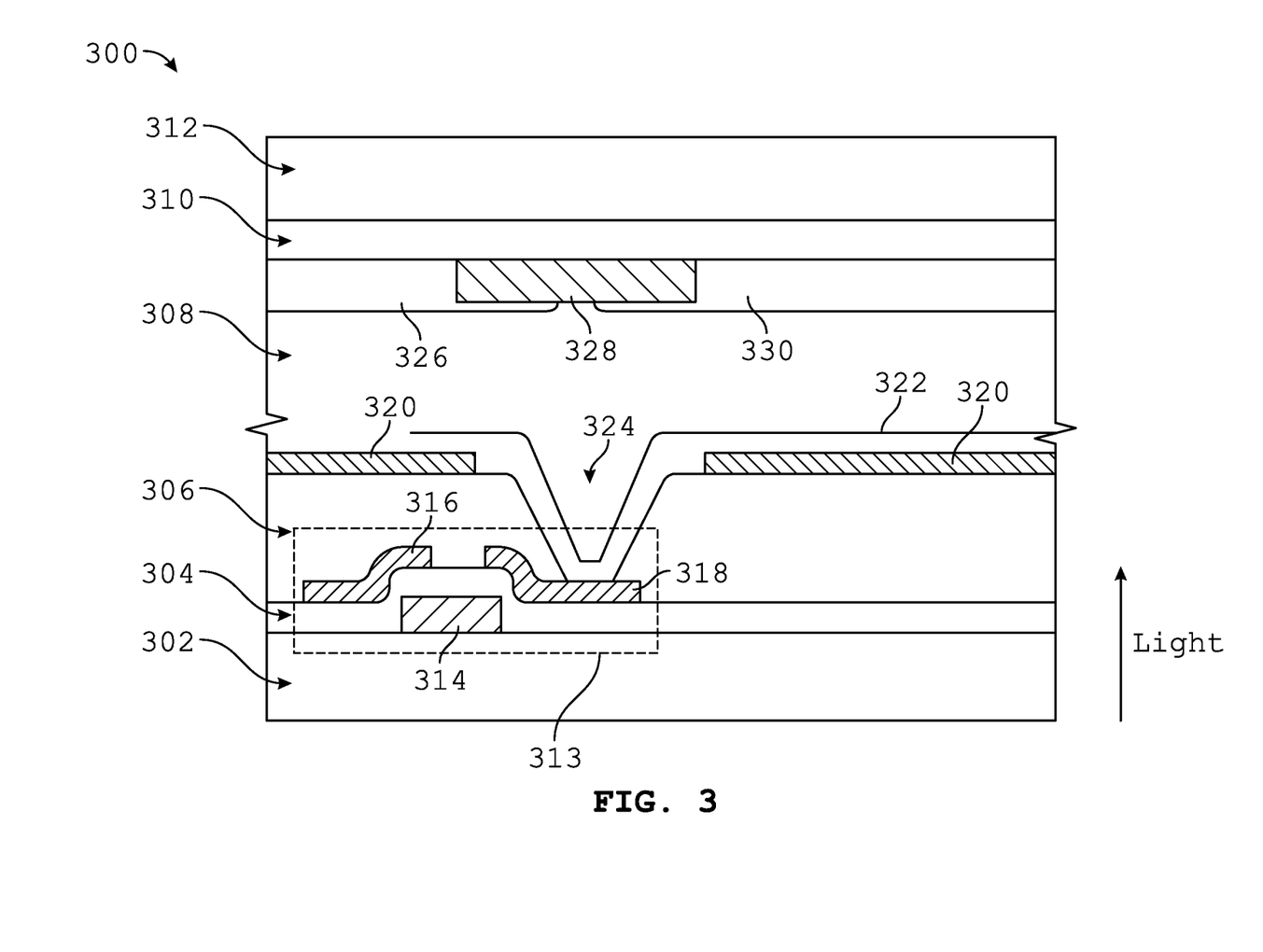
FIG. 3 illustrates an exemplary display stackup according to examples of the disclosure.

FIG. 3 illustrates an exemplary display stackup 300 according to examples of the disclosure. Display stackup 300 can be a stackup of an exemplary liquid crystal display (LCD), though it is understood that other LCD configurations, and other display technologies (e.g., organic light-emitting diode (OLED)), can similarly be utilized in the examples of the disclosure. Display stackup 300 can be formed of one or more layers, as described below. Specifically, thin film transistor (TFT) 313 can be formed on substrate 302, which can be any substrate suitable for use in a display stackup as a TFT substrate, such as TFT glass. TFT 313 can control the luminance of its associated display pixel, and can include data line portion 316, gate line portion 314 and pixel electrode portion 318. In operation, gate line portion 314 can control whether TFT 313 is in an "on" or an "off" state, and/or how "on" or "off" the TFT is. When TFT 313 is in an "on" state, a voltage on data line portion 316 can be substantially transferred to pixel electrode portion 318, which can determine the luminance of the display pixel with which the TFT is associated. Specifically, in some examples, a voltage difference between pixel electrode 322 and common electrode 320 can determine the luminance of the display pixel. Therefore, setting the voltage at pixel electrode 322 via pixel electrode portion 318 of TFT 313, as described above, can determine the luminance of the display pixel. In some examples, common electrode 320 can determine the luminance of multiple display pixels (i.e., the common electrode can be associated with multiple display pixels) in conjunction with individual pixel electrodes of the multiple display pixels. When TFT 313 is in an "off" state, data line portion 316 and pixel electrode portion 318 can be substantially disconnected from each other, thus substantially insulating the pixel electrode portion from any changes in voltage that might occur on the data line portion.

Material 304 can be any insulator (e.g., SiN) suitable for insulating gate line portion 314 from data line portion 316 and/or pixel electrode portion 318 of TFT 313. Material 306 can be any insulator (e.g., a spin-on-glass (SOG) material) for insulating components such as data line portion 316 from pixel electrode 322 and common electrode 320. Material 306 can also provide a planar surface upon which subsequent layers can be formed. Via 324 can electrically connect pixel electrode 322 to pixel electrode portion 318 such that TFT 313, using gate line portion 314 and data line portion 316, can control the luminance of the display pixel with which the TFT is associated. Common electrode 320 can be any conductive material (e.g., Indium Tin Oxide (ITO)) that can be used by one or more display pixels such that a voltage difference between the pixel electrodes of those display pixels (e.g., pixel electrode 322) and the common electrode can determine the luminance of the respective display pixels. A liquid crystal material can exist between pixel electrode 322 and common electrode 320.

Material 308 can be any insulator (e.g., a spin-on-glass (SOG) material) for insulating components such as pixel electrode 322 from components above. Material 308 can also provide a planar surface upon which subsequent layers can be formed. Black mask 328 can hide TFT 313, its related components, and/or optical imperfections that the above may introduce on the display such that a user looking at the display from above may not see or notice such imperfections. Black mask 328 can also separate color filter 326 from color filter 330. Color filter 326 can impart a color (e.g., red, green or blue for an RGB display) to light passing through it for display. Color filter 330 can similarly impart color to light passing through it for display.

Black mask 328 and color filters 326 and 330 can reside underneath substrate 310, which can be any substrate suitable for such a purpose, for example, a color filter glass substrate. Cover glass 312 can be any material suitable for protecting the various components of the display below.

In some examples, adding touch functionality to display stackup 300 can include integrating touch circuitry within the stackup, and in some examples, can include utilizing some of the existing display circuitry as touch circuitry (i.e., dual-use circuitry). Such integration can sometimes pose challenges that can be difficult to overcome. Thus, it can be beneficial to integrate touch circuitry with display stackup 300 in a way that can minimize the effect of the touch circuitry on the operation of the display stackup.

Figure 4:
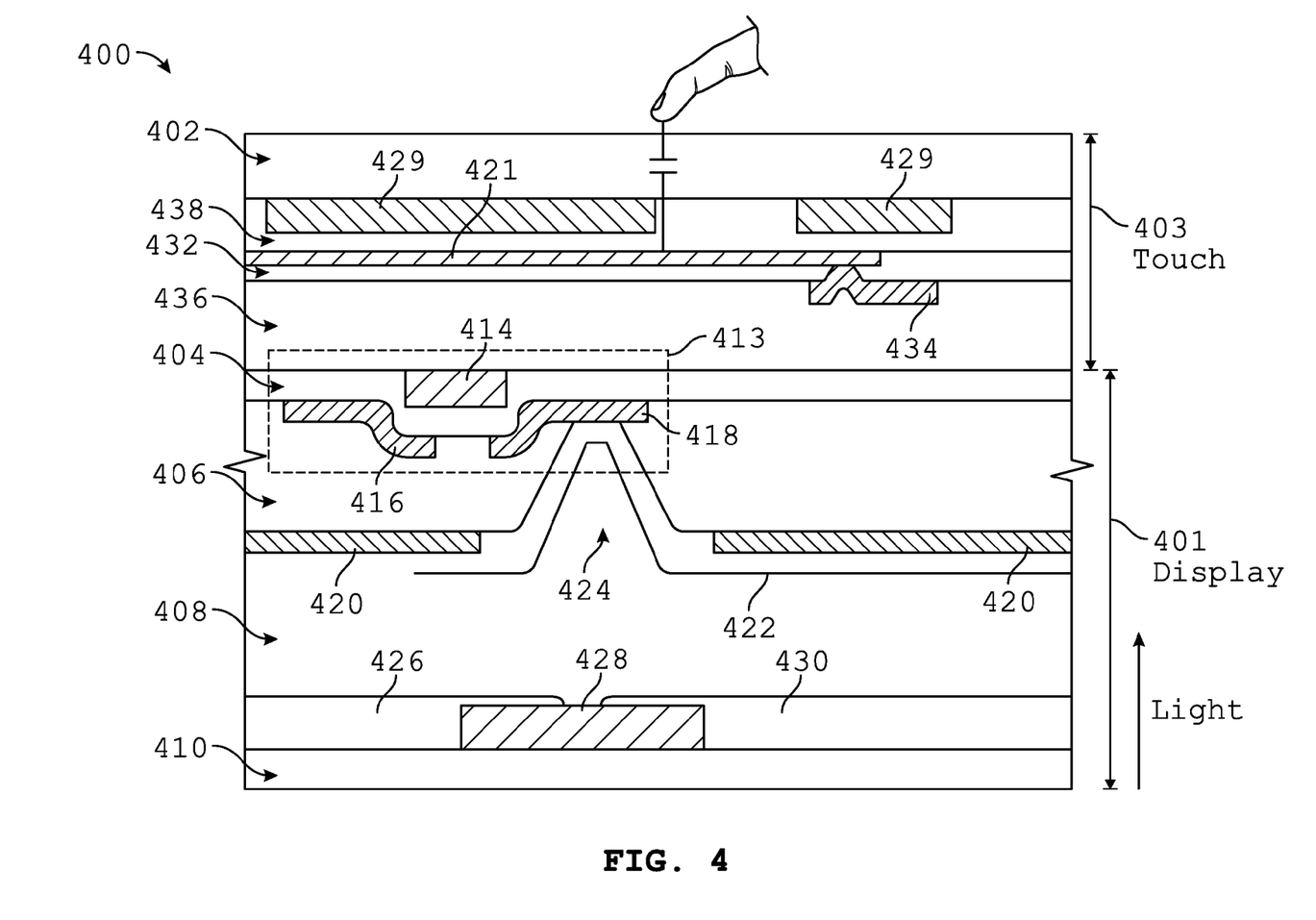
FIG. 4 illustrates an exemplary touch and display stackup of an integrated touch screen according to examples of the disclosure.

FIG. 4 illustrates an exemplary touch and display stackup 400 of an integrated touch screen according to examples of the disclosure. Touch and display stackup 400 can be formed of one or more layers, as described below. Specifically, display portion 401 of touch and display stackup 400 can be substantially the same as display stackup 300 of FIG. 3, except that display portion 401 can be flipped (i.e., upside down) with respect to the orientation of display stackup 300. Note that although black mask 428 is now underneath display pixel TFT 413, it can still serve to hide the TFT, as discussed above. Display portion 401 can extend from color filter glass 410 to material 404, including TFT 413. Because display portion 401 can be substantially the same as display stackup 300 (i.e., have substantially the same layers as display stackup 300), the structure and operation of display portion 401 can be substantially the same as the structure and operation of display stackup 300 (e.g., the structures identified by reference characters 306, 308, 320, 322, 324, 326 and 320 in FIG. 3 are substantially the same as the structures identified by reference characters 406, 408, 420, 422, 424, 426 and 420 in FIG. 4, respectively), and the details will be omitted here for brevity.

Touch portion 403 of touch and display stackup 400 can provide touch detection functionality to the touch screen of the disclosure. Material 436 can insulate TFT 413 and other structures in display portion 401 from structures in touch portion 403, and can be any material suitable for such a purpose, such as an SOG material. Additionally, material 436 can be designed to have any thickness as appropriate for desired touch screen operation—for example, if minimization of capacitances between components in touch portion 403 and components in display portion 401 is desired, material 436 can be relatively thick to minimize the capacitive coupling between the touch portion and the display portion. Touch sensor routing 434 can route signals to and/or from touch sensor electrode 421 to allow for touch detection, as previously described (e.g., the touch sensor routing can carry one or more stimulation signals to the touch sensor electrode for driving the touch sensor electrode, and/or the touch sensor routing can carry one or more touch signals from the touch sensor electrode to sense circuitry for sensing touch). Touch sensor electrode 421 can correspond to a touch pixel electrode in a pixelated self-capacitance touch screen, a drive/sense region in a mutual capacitance touch screen, or any other type of electrode used to detect touch or proximity events on a touch screen. Touch sensor routing 434 can generally be insulated from touch sensor 421 (except where contact is specifically made) by insulator 432, which can be any material suitable for such a purpose, such as SiN.

Touch sensor 421 can be part of any touch sensor pattern that can be used for touch detection. For example, touch sensor 421 can be part of: a self-capacitance touch sensor pattern made up of a matrix of individual and/or electrically isolated touch pixel electrodes (e.g., touch sensor 421 can be one of the touch pixel electrodes of a pixelated self-capacitance touch screen); a self-capacitance touch sensor pattern made up of a collection of individual and/or electrically isolated row and column touch electrodes (e.g., touch sensor 421 can be one of the rows and/or columns of a row/column self-capacitance touch screen); a mutual capacitance touch sensor pattern made up of a collection of row and column electrodes (e.g., touch sensor 421 can be one of the rows and/or columns of a row/column mutual capacitance touch screen); or any other pattern of touch sensors that can be used for touch detection. The area covered by touch sensor 421 can encompass one or more display pixels, each being associated with a respective TFT. Touch signals from touch sensors across the touch screen can be carried by routing such as touch sensor routing 434, as appropriate.

Material 438 can insulate and separate touch sensor 421 from structures above, and can be any material suitable for such a purpose, such as an SOG material. Black mask 429 can, similar to above, hide touch sensor routing 434, its connection (e.g., via) to touch sensor 421, its related components, and/or optical imperfections introduced by the above on the touch screen. In some examples, black mask 429 can additionally or alternatively hide TFT 413 and its related components (e.g., gate line portion 414, data line portion 416, etc.). Finally, material 438 and black mask 429 can reside below substrate 402, which can form the surface of the touch screen, and can be any substrate suitable for such a purpose, such as a TFT glass material (like TFT glass 302 in FIG. 3), plastic, or the like. As illustrated in FIG. 4, in some examples, substrate 402 can have two surfaces that oppose each other: one surface upon which touch and proximity events are to be detected, and another surface on which touch 403 and display 401 portions of touch and display stackup 400 can be formed.

Therefore, in accordance with examples of the disclosure, touch sensing circuitry can be integrated with a display in such a way that the structure and operation of the touch sensing circuitry can be substantially independent from the structure and operation of the display. In other words, while display portion 401 and touch portion 403 of touch and display stackup 400 can be integrated in a single stackup, the two portions can be completely separate within the stackup. As such, the touch sensing circuitry can be designed substantially solely based on desired touch sensing operation with substantially no regard for display operation. Additionally, whereas display stackup 300 can include cover glass 312, touch and display stackup 400 can include TFT glass 402 as the layer forming the surface of the touch screen (i.e., TFT glass 402 can have a surface upon which touch and proximity events can be detected), which can eliminate the need for the touch and display stackup to include a separate cover glass layer. As such, the thickness of touch and display stackup 400 can be less than other touch and display stackups that might require a cover glass layer. Further, without a cover glass layer, touch and proximity events on the touch screen can occur closer to touch sensor 421 (i.e., a distance between the touch sensor and the surface of the touch screen can be less than in a touch screen including a cover glass layer), and therefore better touch screen touch sensitivity can result as touch and proximity events can result in greater changes in self- and/or mutual capacitance measurements of the touch sensor. In addition, by flipping display portion 401 and laying out touch portion 403 as described, touch sensor routing 434, gate line portion 414 and data line portion 416 can be brought relatively close together in touch and display stackup 400 (e.g., closer than they would otherwise have been if display portion 401 had not been flipped), thus making it easier to route connections to the above from a single location on the touch screen, such as from a single flex circuit and/or flex circuit connection utilized to route both touch and display signals on and off the touch screen.

It is understood that exemplary touch and display stackup 400 provides one possible touch screen configuration according to examples of the disclosure, and that other variations of touch and display stackup in which touch sensing circuitry can be integrated with a display are similarly within the scope of the disclosure.

FIGS. 5A-5F illustrate an exemplary process for fabricating touch and display stackup 400 according to examples of the disclosure. Although touch and display stackup 400 can have TFT glass 402 as the "top" layer (i.e., the material forming the surface of the touch screen upon which touch or proximity events are to be detected), in some examples, the touch and display stackup can be fabricated starting with the TFT glass on the "bottom," and the stackup can be subsequently flipped for touch screen operation.

Figure 5A:
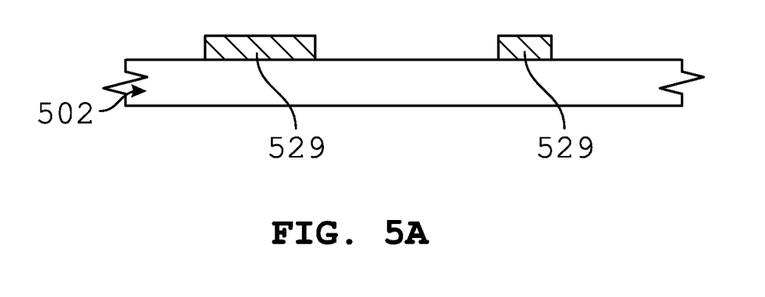
FIGS. 5A-5F illustrate an exemplary process for fabricating a touch and display stackup according to examples of the disclosure.

FIG. 5A illustrates the first step of the exemplary process. Black mask 529 can be formed on one surface of a substrate having two opposing surfaces, such as TFT glass 502—the other surface of the TFT glass can be a surface upon which touch and proximity events are to be detected. Black mask 529 can be formed of any material suitable for the purposes described above, including a polyimide or polysiloxane base having carbon black and/or titanium black coloring agents. Black mask 529 can be part of a black mask layer that can be formed on the one surface of TFT glass 502.

Figure 5B:
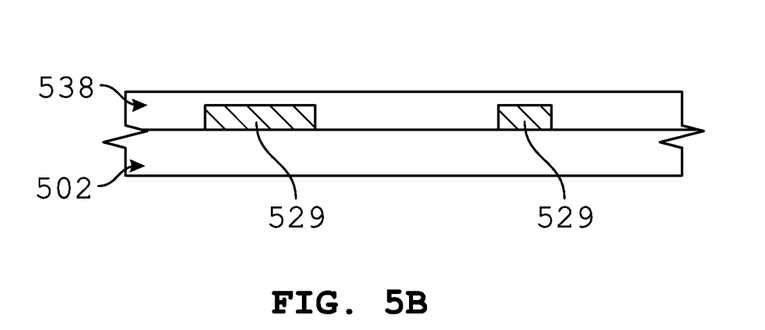

FIG. 5B illustrates the second step of the exemplary process. Material 538 can be formed over black mask 529 and the one surface of TFT glass 502. Material 538 can be any material for insulating and protecting the layers above from the layers below, and can also fulfill a planarization role so that subsequent process steps can be performed on a substantially flat surface. Material 538 can be any material suitable for such a purpose, including an SOG material.

Figure 5C:
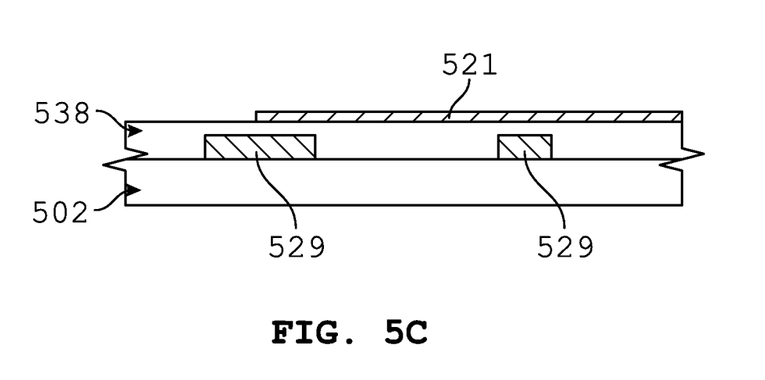

FIG. 5C illustrates the third step of the exemplary process. Touch sensor 521 can be formed over material 538. Touch sensor 521 can be one of a plurality of individual and/or electrically isolated touch sensor electrodes that can be formed across the touch screen in any desired touch sensor pattern, as described above. Touch sensor 521 can be formed of any material suitable for such a purpose, such as an ITO material, and can be part of a touch sensor electrode layer that can be formed over material 538.

Figure 5D:
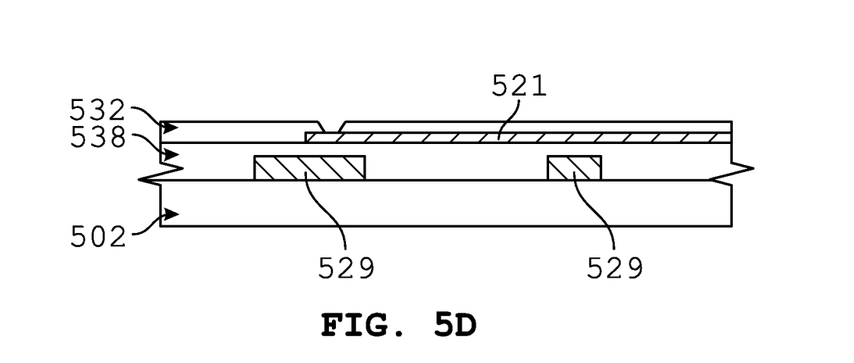

FIG. 5D illustrates the fourth step of the exemplary process. Material 532 can be formed over touch sensor 521 and material 538. Material 532 can insulate touch sensor 521 from routing that can be formed above it, such as touch sensor routing 534. Material 532 can be any material suitable for such a purpose, such as SiN.

Figure 5E:
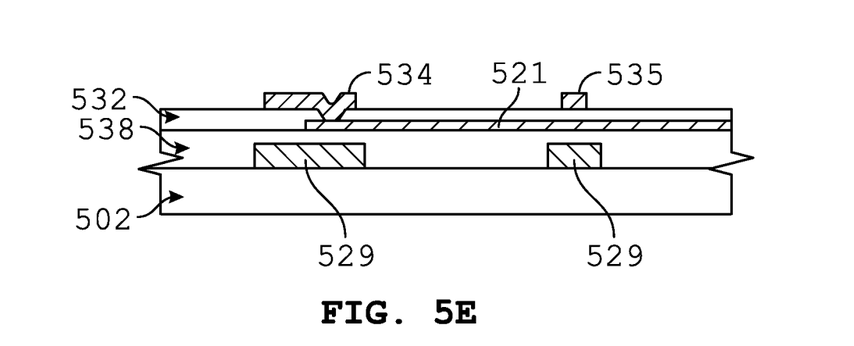

FIG. 5E illustrates the fifth step of the exemplary process. Touch sensor routing 534 can be formed over material 532 to electrically connect to touch sensor 521 and route touch signals to appropriate circuitry (e.g., sense circuitry). Touch sensor routing 535 can represent touch sensor routing that can electrically connect to one or more other touch sensor electrodes on the touch screen, but that passes through the area including touch sensor 521. Touch sensor routing 534 and 535 can be part of a touch sensor routing layer that can be formed over material 532. Though not illustrated, in some examples, some or all portions of touch sensor 521 that are underneath touch sensor routing 535 can include voids/discontinuities/gaps in the touch sensor material such that capacitances (e.g., parasitic capacitances) that may exist as a result of overlap between touch sensor routing 535 and touch sensor 521 can be reduced. In some examples, as illustrated, black mask 529 may be disposed between touch sensor routing 534 and/or 535 and the one surface of TFT glass 502 to hide the touch sensor routing and/or optical imperfections that the touch sensor routing may introduce on the touch screen.

Figure 5F:
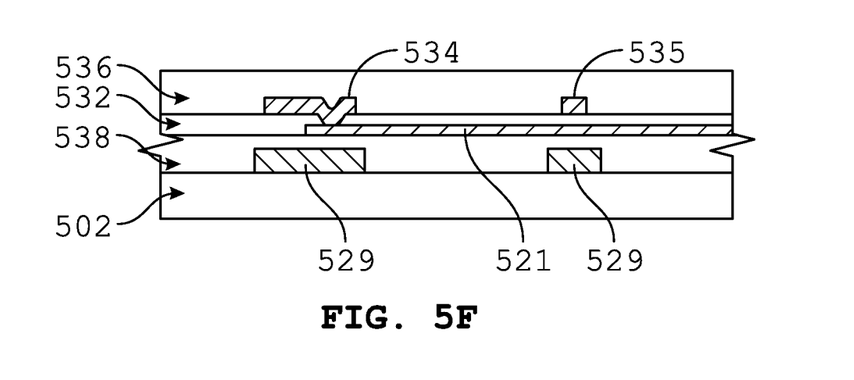

FIG. 5F illustrates the sixth step of the exemplary process. Material 536 can be formed over touch sensor routing 534 and 535, and material 532. Material 536 can be any material for insulating and protecting the layers above from the layers below, and can also fulfill a planarization role so that subsequent process steps can be performed on a substantially flat surface. Material 538 can be any material suitable for such a purpose, including an SOG material.

After the sixth step illustrated in FIG. 5F of the exemplary process, display portion 401 of touch and display stackup 400 can be formed. Display portion 401 can be formed of one or more layers, as discussed above, using any number of processes for forming an LCD display stackup, the details of which are omitted here for brevity. Because touch portion 403 can be formed before display portion 401, the configuration and processing of the display portion need not be substantially affected by the existence of the touch portion below it. Thus, touch portion 403 (and its corresponding function) can be designed substantially independently from display portion 401.

Thus, the examples of the disclosure provide one or more configurations for integrating touch sensing circuitry with display circuitry to form a touch screen.

Therefore, according to the above, some examples of the disclosure are directed to a touch screen comprising: a substrate having a first surface upon which a touch or proximity event is to be detected, and a second surface that opposes the first surface; and a first touch sensor electrode and a first display pixel including a first display pixel TFT formed on the second surface of the substrate, wherein: the first touch sensor electrode is disposed between the second surface of the substrate and the first display pixel TFT, and the first touch sensor electrode is configured to detect the touch or proximity event. Additionally or alternatively to one or more of the examples disclosed above, in some examples, the substrate comprises a TFT glass substrate. Additionally or alternatively to one or more of the examples disclosed above, in some examples, the touch screen further comprises: a first touch sensor routing electrically coupled to the first touch sensor electrode and configured to transmit one or more touch signals associated with the first touch sensor electrode to sense circuitry, wherein the first touch sensor routing is disposed in a layer between the second surface of the substrate and the first display pixel TFT. Additionally or alternatively to one or more of the examples disclosed above, in some examples, the first touch sensor routing is disposed in a layer between the first touch sensor electrode and the first display pixel TFT. Additionally or alternatively to one or more of the examples disclosed above, in some examples, the touch screen further comprises: a second touch sensor routing electrically coupled to a second touch sensor electrode, the second touch sensor routing disposed in a layer between the second surface of the substrate and the first display pixel TFT, wherein the first touch sensor electrode includes a gap at a location corresponding to a location of the second touch sensor routing in the touch screen. Additionally or alternatively to one or more of the examples disclosed above, in some examples, the touch screen further comprises: a common electrode associated with the first display pixel and configured to control a luminance of the first display pixel; and a pixel electrode associated with the first display pixel and configured to control the luminance of the first display pixel, wherein the first touch sensor electrode is disposed in a layer between the common electrode and the second surface of the substrate, and between the pixel electrode and the second surface of the substrate. Additionally or alternatively to one or more of the examples disclosed above, in some examples, the common electrode and the pixel electrode are disposed in one or more layers between the first display pixel TFT and a color filter associated with the first display pixel. Additionally or alternatively to one or more of the examples disclosed above, in some examples, the touch screen further comprises a black mask disposed between the first touch sensor routing and the second surface of the substrate, the black mask configured to hide the first touch sensor routing on the touch screen. Additionally or alternatively to one or more of the examples disclosed above, in some examples, the touch screen further comprises a second display pixel including a second display pixel TFT formed on the second surface of the substrate, wherein the first touch sensor electrode is disposed in a layer between the second surface of the substrate and the second display pixel TFT. Additionally or alternatively to one or more of the examples disclosed above, in some examples, the touch screen further comprises: a common electrode associated with the first display pixel and the second display pixel, the common electrode configured to control a first luminance of the first display pixel and a second luminance of the second display pixel, wherein the first touch sensor electrode is disposed in a layer between the second surface of the substrate and the common electrode. Additionally or alternatively to one or more of the examples disclosed above, in some examples, the first touch sensor electrode comprises part of a pixelated self-capacitance touch sensor electrode pattern.

Some examples of the disclosure are directed to a touch screen comprising: a substrate having a first surface upon which a touch or proximity event is to be detected, and a second surface that opposes the first surface; and a touch sensor electrode layer and a display pixel TFT layer formed on the second surface of the substrate, wherein: the touch sensor electrode layer is disposed between the second surface of the substrate and the display pixel TFT layer, and the touch sensor electrode layer has a plurality of touch sensor electrodes configured to detect the touch or proximity event. Additionally or alternatively to one or more of the examples disclosed above, in some examples, the substrate comprises a TFT glass substrate. Additionally or alternatively to one or more of the examples disclosed above, in some examples, the touch screen further comprises a touch sensor routing layer disposed between the second surface of the substrate and the display pixel TFT layer, wherein the touch sensor routing layer includes touch sensor routing electrically coupled to the plurality of touch sensor electrodes, and is configured to transmit one or more touch signals associated with the touch sensor electrodes. Additionally or alternatively to one or more of the examples disclosed above, in some examples, the touch sensor routing layer is disposed between the touch sensor electrode layer and the display pixel TFT layer. Additionally or alternatively to one or more of the examples disclosed above, in some examples, one or more of the touch sensor electrodes include one or more gaps at locations corresponding to the touch sensor routing. Additionally or alternatively to one or more of the examples disclosed above, in some examples, the touch screen further comprises: a common electrode layer configured to control luminances of a plurality of display pixels; and a pixel electrode layer configured to control the luminances of the plurality of display pixels, wherein the touch sensor electrode layer is disposed between the common electrode layer and the second surface of the substrate, and between the pixel electrode layer and the second surface of the substrate. Additionally or alternatively to one or more of the examples disclosed above, in some examples, the common electrode layer and the pixel electrode layer are disposed between the display pixel TFT layer and a color filter layer. Additionally or alternatively to one or more of the examples disclosed above, in some examples, the plurality of touch sensor electrodes comprise part of a self-capacitance touch sensor electrode pattern.

Some examples of the disclosure are directed to a method for fabricating a touch screen, the method comprising: forming a first touch sensor electrode on a second surface of a substrate, the substrate having the second surface and a first surface that opposes the second surface, the first surface being a surface upon which a touch or proximity event is to be detected by the first touch sensor electrode; and forming a first display pixel including a first display pixel TFT on the second surface of the substrate, wherein the first touch sensor electrode is disposed between the second surface of the substrate and the first display pixel TFT. Additionally or alternatively to one or more of the examples disclosed above, in some examples, the substrate comprises a TFT glass substrate. Additionally or alternatively to one or more of the examples disclosed above, in some examples, the method further comprises: forming a first touch sensor routing electrically coupled to the first touch sensor electrode and configured to transmit one or more touch signals associated with the first touch sensor electrode to sense circuitry, wherein the first touch sensor routing is formed in a layer between the second surface of the substrate and the first display pixel TFT. Additionally or alternatively to one or more of the examples disclosed above, in some examples, the method further comprises: forming a second touch sensor electrode on the second surface of the substrate; and forming a second touch sensor routing electrically coupled to the second touch sensor electrode, wherein the forming the first touch sensor electrode comprises forming the first touch sensor electrode with a gap at a location corresponding to a location of the second touch sensor routing in the touch screen. Additionally or alternatively to one or more of the examples disclosed above, in some examples, the method further comprises: forming a common electrode associated with the first display pixel and configured to control a luminance of the first display pixel; and forming a pixel electrode associated with the first display pixel and configured to control the luminance of the first display pixel, wherein the first touch sensor electrode is formed in a layer between the common electrode and the second surface of the substrate, and between the pixel electrode and the second surface of the substrate. Additionally or alternatively to one or more of the examples disclosed above, in some examples, the first touch sensor electrode comprises part of a pixelated self-capacitance touch sensor electrode pattern.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A touch screen comprising:
   a substrate having a first surface upon which a touch or proximity event is to be detected, and a second surface that opposes the first surface; and
   a first touch sensor electrode and a first display pixel including a first display pixel TFT and a liquid crystal material formed on the second surface of the substrate, wherein:
   the first touch sensor electrode is disposed between the second surface of the substrate and the first display pixel TFT,
   the first display pixel TFT is disposed between the first touch sensor electrode and the liquid crystal material, and
   the first touch sensor electrode is configured to detect the touch or proximity event.

2. The touch screen of claim 1, wherein the substrate comprises a TFT glass substrate.

3. The touch screen of claim 1, further comprising:
   a first touch sensor routing electrically coupled to the first touch sensor electrode and configured to transmit one or more touch signals associated with the first touch sensor electrode to sense circuitry, wherein the first touch sensor routing is disposed in a layer between the second surface of the substrate and the first display pixel TFT.

4. The touch screen of claim 3, wherein the first touch sensor routing is disposed in a layer between the first touch sensor electrode and the first display pixel TFT.

5. The touch screen of claim 3, further comprising:
   a second touch sensor routing electrically coupled to a second touch sensor electrode, the second touch sensor routing disposed in a layer between the second surface of the substrate and the first display pixel TFT,
   wherein the first touch sensor electrode includes a gap at a location corresponding to a location of the second touch sensor routing in the touch screen.

6. The touch screen of claim 3, further comprising a black mask disposed between the first touch sensor routing and the second surface of the substrate, the black mask configured to hide the first touch sensor routing on the touch screen.

7. The touch screen of claim 1, further comprising a second display pixel including a second display pixel TFT formed on the second surface of the substrate,
   wherein the first touch sensor electrode is disposed in a layer between the second surface of the substrate and the second display pixel TFT.

8. The touch screen of claim 7, further comprising:
   a common electrode associated with the first display pixel and the second display pixel, the common electrode configured to control a first luminance of the first display pixel and a second luminance of the second display pixel,
   wherein the first touch sensor electrode is disposed in a layer between the second surface of the substrate and the common electrode.

9. The touch screen of claim 1, wherein the first touch sensor electrode comprises part of a pixelated self-capacitance touch sensor electrode pattern.

10. A touch screen comprising:
    a substrate having a first surface upon which a touch or proximity event is to be detected, and a second surface that opposes the first surface; and
    a touch sensor electrode layer, a display pixel TFT layer, and a liquid crystal material formed on the second surface of the substrate, wherein:
    the touch sensor electrode layer is disposed between the second surface of the substrate and the display pixel TFT layer,
    the display pixel TFT layer is disposed between the touch sensor electrode layer and the liquid crystal material, and
    the touch sensor electrode layer has a plurality of touch sensor electrodes configured to detect the touch or proximity event.

11. The touch screen of claim 10, wherein the substrate comprises a TFT glass substrate.

12. The touch screen of claim 10, further comprising a touch sensor routing layer disposed between the second surface of the substrate and the display pixel TFT layer,
    wherein the touch sensor routing layer includes touch sensor routing electrically coupled to the plurality of touch sensor electrodes, and is configured to transmit one or more touch signals associated with the touch sensor electrodes.

13. The touch screen of claim 12, wherein the touch sensor routing layer is disposed between the touch sensor electrode layer and the display pixel TFT layer.

14. The touch screen of claim 12, wherein one or more of the touch sensor electrodes include one or more gaps at locations corresponding to the touch sensor routing.

15. The touch screen of claim 10, further comprising:
    a common electrode layer configured to control luminances of a plurality of display pixels; and
    a pixel electrode layer configured to control the luminances of the plurality of display pixels,
    wherein the touch sensor electrode layer is disposed between the common electrode layer and the second surface of the substrate, and between the pixel electrode layer and the second surface of the substrate.

16. The touch screen of claim 15, wherein the common electrode layer and the pixel electrode layer are disposed between the display pixel TFT layer and a color filter layer.

17. The touch screen of claim 10, wherein the plurality of touch sensor electrodes comprise part of a self-capacitance touch sensor electrode pattern.

18. A method for fabricating a touch screen, the method comprising:
    forming a first touch sensor electrode on a second surface of a substrate, the substrate having the second surface and a first surface that opposes the second surface, the first surface being a surface upon which a touch or proximity event is to be detected by the first touch sensor electrode; and
    forming a first display pixel including a first display pixel TFT and a liquid crystal material on the second surface of the substrate,
    wherein the first touch sensor electrode is disposed between the second surface of the substrate and the first display pixel TFT, and the first display pixel TFT is disposed between the first touch sensor electrode and the liquid crystal material.

19. The method of claim 18, wherein the substrate comprises a TFT glass substrate.

20. The method of claim 18, further comprising:
    forming a first touch sensor routing electrically coupled to the first touch sensor electrode and configured to transmit one or more touch signals associated with the first touch sensor electrode to sense circuitry, wherein the first touch sensor routing is formed in a layer between the second surface of the substrate and the first display pixel TFT.

21. The method of claim 20, further comprising:
forming a second touch sensor electrode on the second surface of the substrate; and
forming a second touch sensor routing electrically coupled to the second touch sensor electrode,
wherein the forming the first touch sensor electrode comprises forming the first touch sensor electrode with a gap at a location corresponding to a location of the second touch sensor routing in the touch screen.

22. The method of claim 20, further comprising:
forming a common electrode associated with the first display pixel and configured to control a luminance of the first display pixel; and
forming a pixel electrode associated with the first display pixel and configured to control the luminance of the first display pixel,
wherein the first touch sensor electrode is formed in a layer between the common electrode and the second surface of the substrate, and between the pixel electrode and the second surface of the substrate.

23. The method of claim 18, wherein the first touch sensor electrode comprises part of a pixelated self-capacitance touch sensor electrode pattern.

24. The touch screen of claim 1, further comprising:
a common electrode associated with the first display pixel and configured to control a luminance of the first display pixel; and
a pixel electrode associated with the first display pixel and configured to control the luminance of the first display pixel,
wherein the first touch sensor electrode is disposed in a layer between the common electrode and the second surface of the substrate, and between the pixel electrode and the second surface of the substrate.

25. The touch screen of claim 24, wherein the common electrode and the pixel electrode are disposed in one or more layers between the first display pixel TFT and a color filter associated with the first display pixel.

\* \* \* \* \*